United States Patent
Chien et al.

(10) Patent No.: US 12,045,331 B2
(45) Date of Patent: Jul. 23, 2024

(54) DEVICE AND NETWORK-BASED ENFORCEMENT OF BIOMETRIC DATA USAGE

(71) Applicant: AT&T Intellectual Property I, L.P., Atlanta, GA (US)

(72) Inventors: Ginger Chien, Bellevue, WA (US); Zhi Cui, Sugar Hill, GA (US); Eric Zavesky, Austin, TX (US); Robert T. Moton, Jr., Alpharetta, GA (US); Adrianne Binh Luu, Atlanta, GA (US); Robert Koch, Peachtree Corners, GA (US)

(73) Assignee: AT&T Intellect al P Property I, L.P., Atlanta, GA (US)

( * ) Notice: Subject to any disclaimer, the term of this patent is extended or adjusted under 35 U.S.C. 154(b) by 333 days.

(21) Appl. No.: 17/521,264

(22) Filed: Nov. 8, 2021

(65) Prior Publication Data

US 2023/0142898 A1    May 11, 2023

(51) Int. Cl.
*G06F 21/32* (2013.01)
*G06F 21/10* (2013.01)
*G06F 21/62* (2013.01)
*G06V 40/16* (2022.01)

(52) U.S. Cl.
CPC ............. *G06F 21/32* (2013.01); *G06F 21/10* (2013.01); *G06F 21/629* (2013.01); *G06V 40/172* (2022.01); *G06F 2221/2141* (2013.01)

(58) Field of Classification Search
CPC .................................................. G06V 40/172
See application file for complete search history.

(56) References Cited

U.S. PATENT DOCUMENTS

| | | | |
|---|---|---|---|
| 7,602,301 B1 * | 10/2009 | Stirling | A61B 5/6804 340/573.7 |
| 11,689,931 B2 * | 6/2023 | Rinzler | H04M 1/72463 726/22 |
| 2021/0200851 A1 | 7/2021 | Perry et al. | |
| 2021/0200852 A1 * | 7/2021 | Gupta | G06F 21/33 |
| 2021/0406348 A1 * | 12/2021 | Cudak | H04L 67/306 |
| 2022/0012362 A1 | 1/2022 | Kuta et al. | |

OTHER PUBLICATIONS

Apple Support, "About Face ID advanced technology", downloaded from https://support.apple.com/en-us/HT208108, Mar. 9, 2022.
D-ID, "Protect Privacy & Anonymity from Facial Recognition Misuse", Facial Recognition Software, downloaded from https://www.d-id.com/photo-protection/, Mar. 9, 2022.

* cited by examiner

*Primary Examiner* — Clayton R Williams

(57) ABSTRACT

A processing system including at least one processor may receive a first request to access a content by a first user, identify that the content includes biometric data of a second user in accordance with biometric identification data of the second user, and apply at least one biometric data access rule of a biometric data access permission set to the first request in response to the identifying that the content includes the biometric data of the second user.

20 Claims, 4 Drawing Sheets

DEVICE AND NETWORK-BASED ENFORCEMENT OF BIOMETRIC DATA USAGE

The present disclosure relates to methods, computer-readable media, and apparatuses for applying at least one biometric data access rule of a biometric data access permission set to a request of a first user to access content in response to identifying that the content includes biometric data of a second user.

BACKGROUND

Sharing of media content online is ubiquitous. Users receive content via text or email, or encounter content via other's social media posts or by visiting websites, and may forward such content to others via text or email, post content to social media, blogs, websites, and so forth. Many users blindly assume that any or all of such uses are permissible, e.g., since others are doing the same, or do not care because such users may believe that all online content should be free.

SUMMARY

In one example, the present disclosure describes a method, computer-readable medium, and apparatus for applying at least one biometric data access rule of a biometric data access permission set to a request of a first user to access content in response to identifying that the content includes biometric data of a second user. For example, a processing system including at least one processor may receive a first request to access a content by a first user, identify that the content includes biometric data of a second user in accordance with biometric identification data of the second user, and apply at least one biometric data access rule of a biometric data access permission set to the first request in response to the identifying that the content includes the biometric data of the second user.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
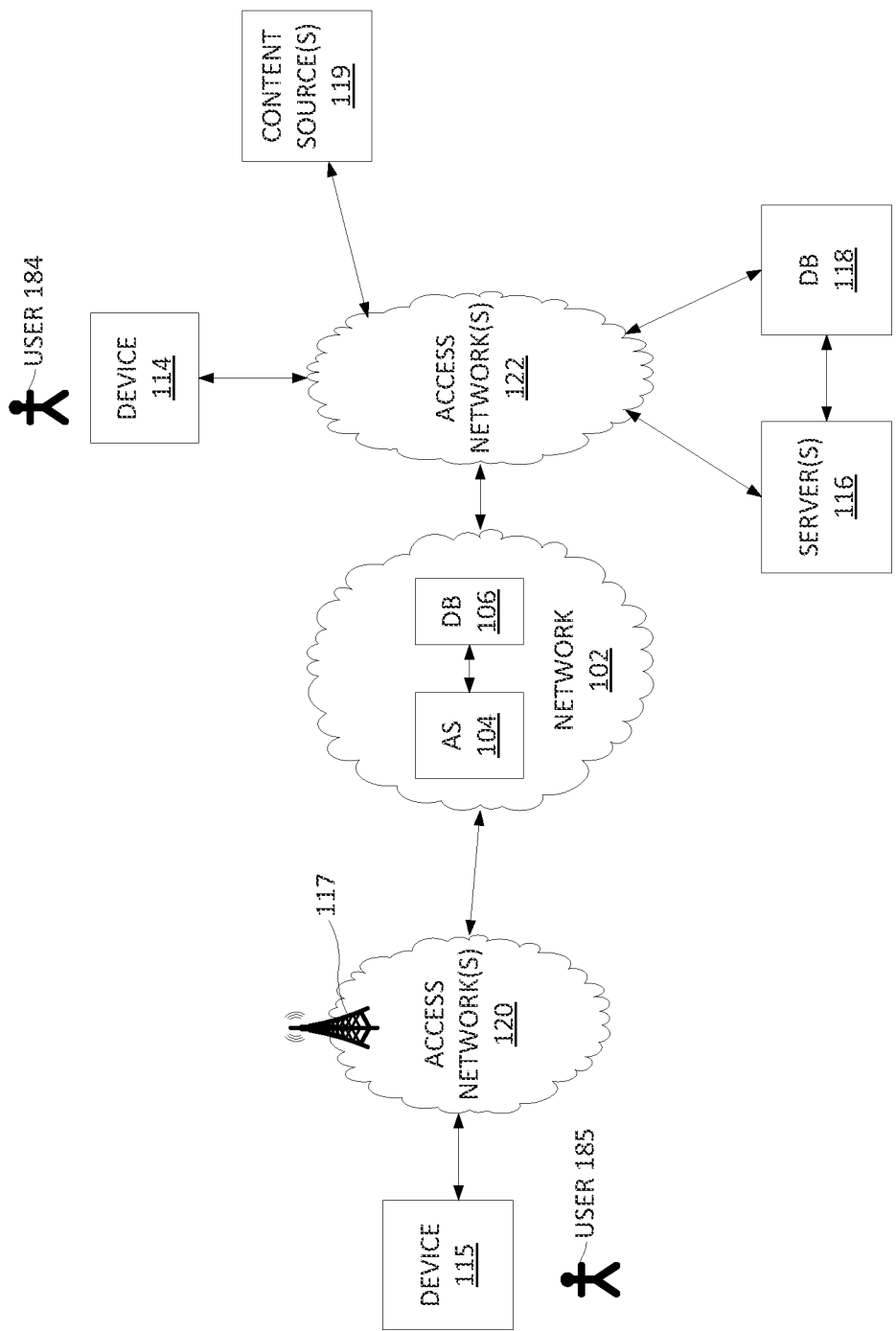
FIG. 1 illustrates an example network related to the present disclosure.

Examples of the present disclosure provide for methods, computer-readable media, and apparatuses for applying at least one biometric data access rule of a biometric data access permission set to a request of a first user to access content in response to identifying that the content includes biometric data of a second user. For instance, examples of the present disclosure enable the management of access to biometric data of a user according to electronically created and stored biometric identification data of the user. The biometric identification data may be created based on electronic sensing, digitizing, and analyzing the user's fingerprint, facial features, voiceprint, iris/retina scan, vein scan, gait, behaviors, or other factors. For instance, a user's "biometric identity," e.g., a collection of one or more types of biometric identification data, may be instantiated as a digital representation of the user's fingerprint, facial features, voiceprint, iris/retina scan, vein scan, gait, behaviors, or other factors. The user's biometric identity may also be represented as a combination of two or more of these factors. In accordance with the present disclosure, the user may have an interest, such as for privacy, security, commercial or other reasons, to manage the use of the user's biometric data. In an illustrative example, a user may manage the use of the user's facial image data. However, other biometric data or a combination of two or more types of biometric data may also apply.

In an example relating to facial biometric identification data, facial features, e.g., visual landmarks, may be used to create a digital spatial representation of the user's face. For instance, distinctive spatial features may be recorded in a 2D map or 3D point cloud. In addition, 2D or 3D distances between facial features may be computed from a digital image. In one example, color, luminosity, and other visual features may also be recorded. These and/or other facial measurements may then be stored as a collection of data point comprising as a facial identifier (facial ID) in a biometric identity database in a record associated with the user. For instance, the user may record a facial image that is transposed into a facial ID (e.g., a type of biometric identification data), such as using a camera of the user's smart phone or other computing devices, and uploaded to a biometric data access server.

To enable the user to establish rights to control access to the user's own biometric data, the user may use his or her smart phone or another computing device to capture other biometric data/features to be used as biometric identification data. For instance, the user may record a fingerprint image, and audio/voice recording, and so forth, which may be stored as biometric identification data, and/or from which features may be extracted and transposed into a respective fingerprint model, voice signature, etc. By enabling the capture of multiple types of unique biometric identification data, the present disclosure allows for a unique identification of the user. As such, the user's sole right to the user's biometric data may be established and recorded in a user record of a biometric identity database associated with the biometric data access server.

The biometric data access server may interact with the user to present selectable options for allowable usage of the user's biometric data. The user may grant permission for the biometric data access server to manage access to the user's biometric data and may further specify settings for the allowable access and/or other usage. For instance, in the case of a facial biometric data, the user may specify the terms and conditions under which the user's facial image may or may not be used by others. Example settings for usage of the user's facial image may include: "block all usage," "ask me always," "allow all use," "allow all use by specific requesters," "allow for a fee," and so forth. Example settings may also be specific to the requested types of use, such as "allow all viewing," "ask for printing," "fee for reposting," and so on.

One example of a requested usage of a user's facial image may be in connection with a video from a security camera. For example, the video from the security camera may be sent to the biometric data access server for temporary holding and release by a user before the user's facial image in the video is presented to a requester. For instance, a viewer/requester of the security camera footage may be a city planner who would like to use the video to analyze pedestrian traffic in an area of the city. Before presenting the video to the requester, the city planner in this case, the video may be analyzed by the biometric data access server to identify if any of the facial IDs in the biometric identity database are a match to facial images in the video. For instance, if the user's facial biometric data is identified in the video (e.g., using the facial ID as a matching filter), and the user has set a facial biometric data access setting to "block all use," the biometric data access server may blur, pixelate, block-out, overwrite, distort, or otherwise obfuscate portions of the video containing the user's facial image (e.g., portions of video frames containing the user's facial image) to preserve the user's facial identity rights.

Certain requesters may have the ability to override the facial biometric data access setting (or other biometric data access settings) set by the user, such as law enforcement personnel, for example. In one example, a requester may be one who discovers a still image or video containing the user's facial image, for instance via a social networking application (app), a website, or other sources of online media. If the requester attempts to capture the image, forward the image, or make other use of the image via the requester's computing device, the app, browser, or other applications or processes on the requester's computing device may first consult the biometric data access server to determine the facial image usage rights, or conditions (if any) that may be applicable to the image. In one example, the image may be sent to the biometric data access server, e.g., by the requester's computing device, to scan the image for any facial images matching a facial ID of a user in the biometric identity database. Alternatively, the biometric data access server may be directed as to how and/or where the subject image may be retrieved, such as being provided with a uniform resource locator (URL), being provided with a server Internet Protocol (IP) address and filename, etc. In either case, the facial image of the user may be detected in the image by the biometric data access server using the facial ID of the user. In addition, the user may have set a facial biometric data access setting to require a fee or acknowledgement for use of the user's facial image. Thus, for example, if the requester attempts to store the image locally or to a cloud-based file locker or the like, to record a screen-capture containing the image, etc., the user may be first prompted by the biometric data access server to release the right to use the facial image of the user. Alternatively, or in addition, if a fee is to be charged for the use of the facial image, the requester may be presented with a prompt by the biometric data access server to execute a payment, which may result in a credit to the user.

It should be noted that in one example, a requester may initially have a first level of access to the content. This may be a blanket right, such as the ability to view a security camera video recorded in a public place, or may be in accordance with the biometric data access permission of the user. However, the requester may seek a second level of access in accordance with the biometric data access setting. For instance, the requester may be part of a class of users having unrestricted access to view the security video, or otherwise permitted to view the facial image of the user in the video. However, the requester may then seek to use the video beyond simply viewing. For instance, the requester may seek to store the video locally, to print an image from the video, to copy a portion of the video for use in promotional material, to repost an image from the video to a blog, etc. As such, the requester's computing device may provide the video to the biometric data access server or direct the biometric data access server as to how to access the video in order to determine any applicable biometric data access settings (e.g., a requirement of a fee for a second level of access/usage of the user's facial image, such as a fee for copying the video for use in promotional material). It should be noted that in one example, if the requester refuses the requirement for a fee, the video may still be used without the biometric data (facial image) of the user (e.g., by extraction, overwriting, blurring, etc.).

Examples of the present disclosure thus enable the user to monitor and regulate various potential online electronic usage of the user's facial image. For instance, there may be multiple requesters over a period of time that gain access to the user's facial image through various sources, some of which the user may not be aware of. For example, the user's facial image may appear on a website that the user was unaware, and which is not authorized to access or otherwise use the user's facial image. Therefore the user may be presented with a report listing of all sources that provided the user's facial image (or other biometric data) to any requesters. The user may thus identify any sources that are using the user's facial image in an unapproved manner and may request the usage to be discontinued, may request a fee or other acknowledgments to be provided to the user, and so forth. At the same time, these users may be informed that there are biometric data rights attached to the media/content the users seek to access. Thus, users who would like to respect the biometric data usage rights of others may be assisted via the biometric data access server.

In one example, the biometric data access server may also search for all usage of a user's biometric data (such as facial image data) upon the request of the user. For instance, representations of the users face in still images or video may exist online. The user may execute a query to the biometric data access server, which may use the user's facial ID to send a query to a plurality of sources of video and image data. The sources may identify and/or provide copies of the videos or images that are found with matches including the user's facial image(s). The images or videos returned may return only the portion of the image(s) (e.g., still images, video frames, etc.) that is/are pertinent to the user. The images or videos returned may also include identifying information such as meta-data that is associated with how, when, or where the image or video was captured, and so forth. Alternatively, or in addition, the biometric data access server may execute a web crawler application or service that accesses media of various online sources and scans the media for the user's facial image or other biometric data.

In one example, the biometric data access server may periodically audit the biometric identities within the biometric identity database. For instance, the biometric data access server may compare the facial ID of a first user with facial IDs of all or a portion of other users in the biometric identity database. In one example, if there is a match, or a matching score above a threshold between the first user's facial ID and a facial ID of some other user, the first user may be prompted to have the first user's facial ID re-created with additional input images, different input images, a larger number of landmarks or other visual features extracted from such images, and so forth, which may be used to create a more finely-tuned facial ID. Similarly, the first user may also be prompted to have the first user's facial ID be re-created if the first user's facial authentication via the first user's computing device is discovered to fail from time to time and has reached a threshold number of failures. This may indicate, for instance, that the first user should update the first user's facial ID due to changes that have occurred, such as due to aging, facial surgery, scars, or other changes that have caused the threshold number of failures to occur. These and other aspects of the present disclosure are discussed in greater detail below in connection with the examples of FIGS. 1-4.

To further aid in understanding the present disclosure, FIG. 1 illustrates an example system 100 in which examples of the present disclosure for applying at least one biometric data access rule of a biometric data access permission set to a request of a first user to access content in response to identifying that the content includes biometric data of a second user may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a core network of a telecommunication network. The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3 rd party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like. In one example, each of access networks 120 and 122 may include at least one access point, such as a cellular base station, non-cellular wireless access point, a digital subscriber line access multiplexer (DSLAM), a cross-connect box, a serving area interface (SAI), a video-ready access device (VRAD), or the like, for communication with various endpoint devices. For instance, as illustrated in FIG. 1, access network(s) 120 include a wireless access point 117 (e.g., a cellular base station).

In one example, the access networks 120 may be in communication with various devices or computing systems/processing systems, such as device 115, and so forth. Similarly, access networks 122 may be in communication with one or more devices or processing systems (e.g., computing systems), e.g., device 114, server(s) 116, database (DB) 118, content source(s) 119, etc. Access networks 120 and 122 may transmit and receive communications between device 115, device 114, content source(s) 119, server(s) 116 and/or database (DB) 118, application server (AS) 104 and/or database (DB) 106, other components of network 102, devices reachable via the Internet in general, and so forth.

In one example, each of the devices 114 and 115 may comprise a mobile computing device, a cellular smart phone, a laptop, a tablet computer, a desktop computer, a wearable computing device (e.g., a smart watch, a smart pair of eyeglasses, etc.), an application server, a bank or cluster of such devices, or the like. In accordance with the present disclosure, either or both of the devices 114 and 115 may comprise a computing system or server, such as computing system 400 depicted in FIG. 4, and may be configured to perform operations or functions in connection with examples of the present disclosure for applying at least one biometric data access rule of a biometric data access permission set to a request of a first user to access content in response to identifying that the content includes biometric data of a second user (such as illustrated and described in connection with the example method 300 of FIG. 3). For instance, device 115 may include an application (app), a browser plug-in, or the like for biometric data usage management, and which may establish communication with server(s) 116 and/or content source(s) 119 to access content, to identify biometric data subject to usage conditions, to gain access rights in accordance with such usage conditions, and so forth.

Figure 4:
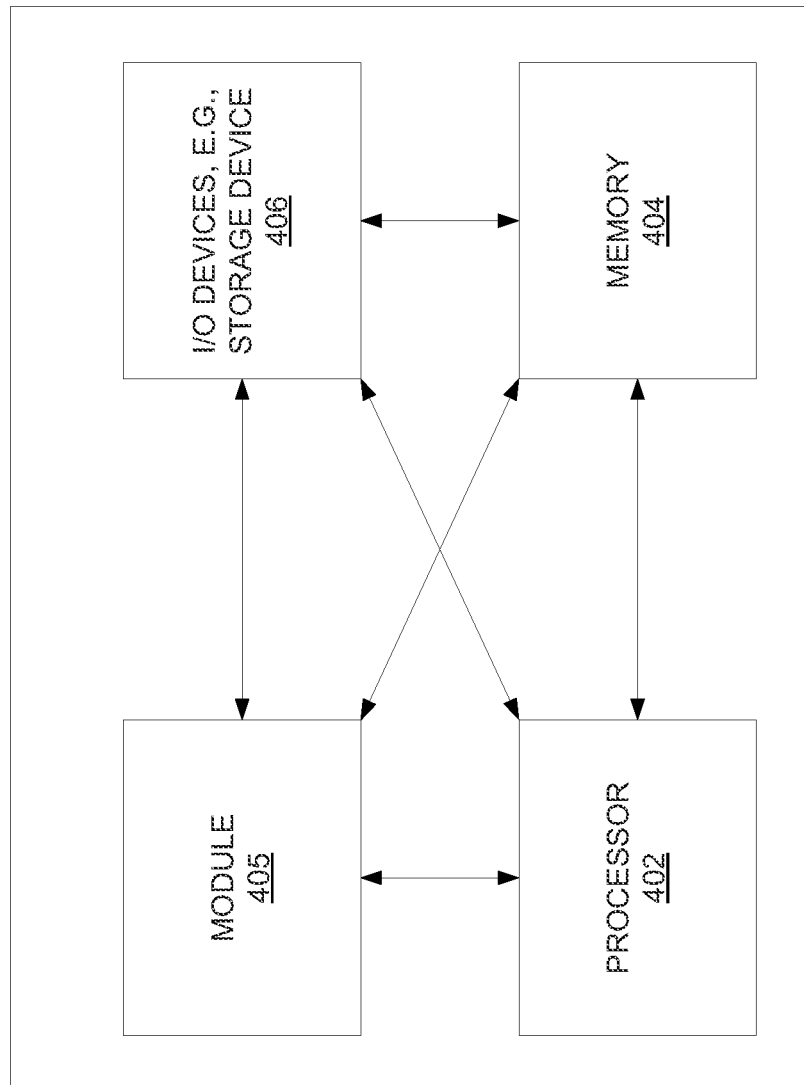
FIG. 4 illustrates a high level block diagram of a computing device specifically programmed to perform the steps, functions, blocks and/or operations described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

Content source(s) 119 may comprise one or more servers providing one or more types of content, such as text, audio, video, multimedia, etc. For instance, content may include blogs, video logs (v-logs), podcasts, text, video, audio news stories, reviews, descriptions, debates, opinions, articles, digital books or magazines, multimedia webpages comprising one or multiple of the above types of content, and so forth. For instance, content source(s) 119 may comprise one or more servers (e.g., one or more web servers). In one example, content source(s) 119 may include a database comprising one or more physical storage devices integrated with such a server, or servers (e.g., database server(s)), attached or coupled to the server(s), or remotely accessible to the server(s) to store various content, or content items, e.g., individual articles, stories, videos, audio tracks or clips, social media posts, and so forth.

In one example, content source(s) 119 may include one or more sensor devices (e.g., including media capture devices), such as a microphone, a camera (e.g., a security camera, a traffic camera, etc.), and so on. In addition, such sensors may be fixed location sensors and/or mobile sensors, such as a sensor-equipped autonomous aerial vehicle (AAV) with a camera, microphone, and/or other sensors, one or more radio frequency (RF) transceivers for cellular communications and/or for non-cellular wireless communications, etc. In one example, each of the content source(s) 119 may communicate independently with access network(s) 120. In another example, one or more of the content source(s) 119 (e.g., sensor devices) may comprise a peripheral device that may communicate with remote devices, servers, or the like via access networks 122, network 102, etc. via another endpoint device, such as a smart home hub, a home gateway or router, or the like. Thus, one or more of these sensor devices may have a wired or wireless connection to another local device that may have a connection to access networks 120.

As illustrated in FIG. 1, access networks 122 may be in communication with one or more servers 116 and one or more databases (DB(s)) 118. In accordance with the present disclosure, each of the server(s) 116 may comprise a computing system or server, such as computing system 400 depicted in FIG. 4, and may individually or collectively be configured to perform operations or functions for applying at least one biometric data access rule of a biometric data access permission set to a request of a first user to access content in response to identifying that the content includes biometric data of a second user (such as illustrated and described in connection with the example method 300 of FIG. 3). For instance, server(s) 116 may host a biometric data usage management service that may identify biometric data subject to access/usage conditions, and via which access and/or usage rights may be requested and provided to requesting entities, such as device 115 and/or a user thereof.

In one example, DB(s) 118 may comprise one or more physical storage devices integrated with server(s) 116 (e.g., a database server), attached or coupled to the server(s) 116, or remotely accessible to server(s) 116 to store various types of information in support of systems for applying at least one biometric data access rule of a biometric data access permission set to a request of a first user to access content in response to identifying that the content includes biometric data of a second user, in accordance with the present disclosure. For example, DB(s) 118 may include a content source database that may store information about various content sources (e.g., content source(s) 119), such as, for each content source: a type (or types) of content of the content source, uniform resource locators (URLs) or other identifiers to access the content source, and so forth. For example, DB(s) 118 may include a record for each of the content source(s) 119. DB(s) 118 may also store "biometric identities" and associated rules/conditions for biometric data usage for various users, such as user 184 (e.g., a biometric identity database). For instance, each user record may include one or more types of biometric identification data (e.g., a facial ID, voice signature, etc.). The rules for access to and/or other usage of corresponding biometric data may include "block all usage," "ask me always," "allow all use," "allow all use by specific requesters," "allow for a fee," and so forth. For a given user, the rules may be different for different types of biometric data. For instance, user 184 may set a rule/condition for voice data as "ask me always" and may set a different rule/condition for facial image data of "block all usage." In addition, for a given user, the rules may be different for different requesters or different classes of requesters. In one example, DB(s) 118 may also store machine learning models (MLMs) or other detection models that may be trained to detect biometric data of a given type for a given user. For instance, a trained MLM for detecting facial image data of a user may comprise a facial ID, e.g., a facial image detection model. Similarly, an eigenface of a user may be trained from one or more images of the user and may thus comprise a facial ID, or signature, for detecting instances of the user's facial image in still images, video, or other visual content. Similarly, a training data set comprising one or more audio clips containing a user's voice may be applied to machine learning algorithm (MLA) to provide a trained MLM (e.g., a voice signature).

In an illustrative example, user 185, via device 115, may seek content from content source(s) 119, e.g., a social media post by another. In one example, device 115 may obtain the content from content source(s) 119 and may provide the content to server(s) 116, or may request the content from content source(s) 119 via server(s) 116. In another example, device 115 may provide information to server(s) 116 regarding how to retrieve the content from content source(s) 119 that the user 185 seeks to access, which server(s) 116 may then request and obtain accordingly. Thus, in either case, server(s) 116 may obtain the content. Server(s) 116 may then perform a process to identify if any biometric data exists in the content that is subject to any conditions/rules of usage/access. In one example, the content may initially be accessed for viewing at device 115 (e.g., without scanning by server(s) 116), while additional usage may be subject to associated access/usage condition(s). In another example, the content may be pre-scanned by server(s) 116 before presentation on device 115 (e.g., if allowed in accordance with associated access/usage condition(s)). For illustrative purposes, it may be assumed that the latter applies and that the content is pre-scanned by server(s) 116.

For example, server(s) 116 may determine that the social media post includes image content (e.g., a still image or video) and may then scan the content for relevant biometric data, such as facial image data of one or more users. For illustrative purposes, the social media post may include a photograph of a party that includes a facial image of user 184. Thus, for instance, server(s) 116 may scan the image content of the social media post against various facial IDs (e.g., eignefaces or the like) in a biometric identity database of DB(s) 118. In addition, server(s) 116 may determine that there is a match to a facial ID of user 184, and hence that a facial image of user 184 appears in the content. As such, server(s) 116 may then apply an associated access/usage condition contained in the user record in the biometric identity database to the request of user 185 to access the content. For instance, user 184 may have selected that for facial images, "access to view" may be set to "allow all use." Thus, server(s) 116 may inform device 115 of the authorization to view the content, or may provide the content to device 115 (e.g., in an example in which the content is requested via server(s) 116). Accordingly, device 115 may display the content (e.g., the social media post) for user 185 to view.

Continuing with the present example, the user 185 may also seek further usage of the image contained in the social media post. In addition, since the image includes the facial image of user 184, the additional usage may be subject to an associated access/usage condition. For example, user 184 may have selected that for facial images, access to "repost" may be set to "ask me always." To illustrate, user 185 may click a button via a social media app to "repost." The social media app, or an additional application or program running concurrently on device 115 may intercept the request, and submit the request to server(s) 116, which may determine to query user 184 in accordance with the applicable access/usage condition. Thus, for instance, a query may be sent by server(s) 116 to user 184 via device 114. The query may be sent as an email, Short Message Service (SMS)/text message, an app-based message, etc. and may be presented via a display of device 114, in an audio format via a speaker of device 114 or an attached headset, and so forth. In any case, user 184 may provide a response via a touch input, via a voice command, or other inputs, which may be returned to server(s) 116. Assuming that the input is affirmative to grant permission, server(s) 116 may then respond to device 115 with the authorization to allow the requested access (e.g., to allow user 185 to complete a process of reposting the image via the social media app).

It should again be noted that requesters, such as user 185, may value such a service provided by server(s) 116 insofar as such requesters may desire to ensure that they respect the biometric data access rights and conditions of others, or to at least minimize the usage that may be against such others' preferences. For instance, a friend-of-a-friend may not wish to upset a person in a social media post by reposting against the person's wishes, but could do so inadvertently without being aware of the person's biometric data usage conditions. In contrast, examples of the present disclosure may detect and help prevent such a scenario to the benefit of both the requester and the user whose biometric data usage rights may be affected.

In another example, content source(s) 119 may comprise a traffic camera providing a video (e.g., a video feed) to device 115. For instance, user 185 may comprise a remote monitoring personnel who reviews the video feed for active traffic management, for traffic study purposes, etc. As noted above, in one example, a first level access to view the video may be implied or inherent. For example, it may be assumed that user 185 (and/or an organization for which user 185 is performing services) has an inherent right to capture and review the video for traffic management or traffic study purposes. Thus, the video may be streamed from one of the content source(s) 119 to device 115. However, user 185 may desire to use an image from the video feed for another purpose. For instance, user 185 may wish to print an image from the video for use in presentation for a budget meeting. Accordingly, user 185 may provide an indication of this intended/desired use which device 115 may submit to server(s) 116 along with the image for which the intended use is indicated. Server(s) 116 may then scan the image for any implicated biometric data access/usage conditions. For instance, as in the preceding example, server(s) 116 may scan the content for facial images having matching facial IDs from a biometric identity database of DB(s) 118.

For illustrative purposes, a facial image of user 184 may be detected in the image. Thus, server(s) 116 may apply a corresponding biometric data access condition/rule as set by user 184. For instance, user 184 may have set a rule for "allow print access for fee." In this case, a query may be sent by server(s) 116 to user 185 at device 115. The query may be sent an email, Short Message Service (SMS)/text message, an app-based message, etc. and may be presented via a display of device 115, in an audio format via a speaker of device 115 or an attached headset, or the like. In any case, user 185 may provide a response via a touch input, via a voice command, or other inputs, which may be returned to server(s) 116. Assuming that the input is affirmative to accept the fee requirement, server(s) 116 may deduct the fee from an account of user 185, may direct user 185 to a payment site or an online payment portal, may present a payment interface via an app on device 115 to collect payment information, or the like. When completed, server(s) 116 may then respond to device 115 with the authorization to allow the requested access (e.g., to allow user 185 to complete a process of printing via device 115 and/or via a printer attached to or in communication with device 115).

In one example, multiple users may inadvertently have biometric data captured in a same content/media available that is available online. Thus, for instance, bystanders caught in a picture of some event may not wish for their facial images to be identifiable in digital photographs posted to various news websites about the event. However, other bystanders may not have similar concerns, or may find it entertaining to be in a newsworthy image. Notably, examples of the present disclosure allow participating news sites to screen the image before posting to determine which, if any, biometric data access conditions may be applicable. Thus, for instance, content source(s) 119 may include a website or online repository of photographs, which may include photographs of current events. User 185 may be writing a story about one such event and may desire to post an article with one or more images of the event. For example, user 185 may find a desirable photograph via one of the content source(s) 119. Accordingly, device 115 may submit a request to server(s) 116 to scan the image to determine which, if any, biometric data access conditions may be applicable. For instance, there may be several users (e.g., bystanders) having facial images identified in the photograph via respective facial IDs in the biometric identity database of DB(s) 118. Various bystanders may have conditions set to "allow all access," "block all access," or "allow for fee" for instance. In one example, user 185 may be notified that there are one or more subjects (e.g., bystanders) having facial images identified in the photograph with "allow for fee" settings. Thus, user 185 may be prompted to agree to various fees. However, for illustrative purposes, it may be assumed that the user 185 is not interested in coordinating fees with any bystanders that may be included in the photograph. Accordingly, server(s) 116 may modify the photograph such that the facial images of non-consenting bystanders (e.g., those with "block all access" settings/condition or "allow for fee" for facial image data) are not identifiable (e.g., by blocking-out, blurring, etc.) and may return the modified photograph to device 115 for use in posting the article. Thus, user 185 may post the modified photograph along with the article in full compliance with the various users' biometric data access conditions.

It should be noted that in accordance with the present disclosure, server(s) 116 may apply various detection models for identifying relevant biometric data within various content/media. For instance, server(s) 116 may train, store (e.g., in a biometric identity database of DB(s) 118), and use a quantized vector of a face of a user as a facial ID. For instance, a feature vector representing a face of a particular known individuals may be trained from an image or video library comprising a cross-section of images or video of the known individual (e.g., in various gestures, expressions, poses, lighting conditions, etc.). In one example, server(s) 116 may train, store, and use a respective scale-invariant feature transform (SIFT) model, or a similar reduced feature set derived from image(s) of the user's face from various angles, different lighting conditions, etc., which may be used for detecting additional instances of the user's facial image in visual information from content source(s) 119 via feature matching. Thus, in one example, a feature matching detection algorithm employed by server(s) 116 may be based upon SIFT features. However, in other examples, different feature matching detection algorithms may be used, such as a Speeded Up Robust Features (SURF)-based algorithm, a cosine-matrix distance-based detector, a Laplacian-based detector, a Hessian matrix-based detector, a fast Hessian detector, an eigenface-based detector, etc. Similarly, a quantized vector, or set of quantized vectors representing a facial ID may be encoded using techniques such as principal component analysis (PCA), partial least squares (PLS), sparse coding, vector quantization (VQ), deep neural network encoding, and so forth. In one example, server(s) 116 may obtain new content and may calculate the Euclidean distance, Mahalanobis distance measure, or the like between a quantized vector of the facial image data in the content and the feature vector(s) (e.g., a facial ID) of the user to determine if there is a best match (e.g., the shortest distance) or a match over a threshold value.

In one example, detection models for biometric data in image/video content may be in accordance with one or more machine learning algorithms (MLAs), e.g., one or more trained machine learning models (MLMs). For instance, a machine learning algorithm (MLA), or machine learning model (MLM) trained via a MLA may be for detecting a single object/item, or may be for detecting a single item from a plurality of possible items that may be detected via the MLA/MLM. For instance, the MLA (or the trained MLM) may comprise a deep learning neural network, or deep neural network (DNN), such as convolutional neural network (CNN), a generative adversarial network (GAN), a support vector machine (SVM), e.g., a binary, non-binary, or multi-class classifier, a linear or non-linear classifier, and so forth. In one example, the MLA/MLM may be a SIFT or SURF features-based detection model, as mentioned above. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. It should also be noted that various pre-processing or post-recognition/detection operations may also be applied. For example, server(s) 116 may apply an image salience algorithm, an edge detection algorithm, or the like (e.g., as described above) where the results of these algorithms may include additional, or pre-processed input data for the one or more MLAs.

The visual features used for generating a quantized vector representing a facial ID, or similarly used to train a MLM-based detection model, may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like.

Similarly, server(s) 116 may generate, store, and/or use various speech or other audio detection models (e.g., users' voice signatures), which may be trained from extracted audio features from one or more representative audio samples, such as low-level audio features, including: spectral centroid, spectral roll-off, signal energy, mel-frequency cepstrum coefficients (MFCCs), linear predictor coefficients (LPC), line spectral frequency (LSF) coefficients, loudness coefficients, sharpness of loudness coefficients, spread of loudness coefficients, octave band signal intensities, and so forth, wherein the output of the model in response to a given input set of audio features is a prediction of whether a voice of a particular user is or is not present.

With regard to fingerprints, a fingerprint signature may be generated, stored (e.g., in a biometric identity database of DB(s) 118), and used by server(s) 116 to detect new instances of a user's fingerprint in images. For instance, server(s) 116 may apply a pattern matching process which may include identifying spatial features, such as the ridge and trough positions, curvatures, distinctive patterns, such as swirls, whorls, etc., scars, etc. of the stored fingerprint record (e.g., fingerprint ID) and then detecting whether the spatial features, the spatial relations between such spatial features, etc., are a match with the fingerprint image(s) received from content source(s) 119 and/or provided by device 115. Similar spatial relations may comprise features used for matching a retina image to a stored retina scan or retina ID/retina detection model, and so forth. For instance, when there is a high degree of matching (e.g., exceeding a threshold, such as a 95 percent match with respect to the overall number of visual features, a 90 percent match, an 88 percent match, etc.), the server(s) 116 may conclude that the biometric data of the user is identified in the content (i.e., positively confirmed).

It should again be noted that any number of server(s) 116 or database(s) 118 may be deployed in the system 100. In one example, network 102 may also include an application server (AS) 104 and a database (DB) 106. In one example, AS 104 may perform the same or similar functions as server(s) 116. Similarly, DB 106 may store the same or similar information as DB(s) 118 (e.g., a biometric identity database, content source database, etc.). For instance, network 102 may provide a service to subscribing websites and/or user devices in connection with a biometric data usage management service, e.g., in addition to television, phone, and/or other telecommunication services. In one example, AS 104, DB 106, server(s) 116, and/or DB(s) 118, device 114, device 115, and/or content source(s) 119, may operate in a distributed and/or coordinated manner to perform various steps, functions, and/or operations described herein.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like, for packet-based streaming of videos or video segments that may be provided in accordance with the present disclosure. Similarly, although only two access networks 120 and 122 are shown, in other examples, access networks 120 and/or 122 may each comprise a plurality of different access networks that may interface with network 102 independently or in a chained manner. For example, device 114, content source(s) 119, and server(s) 116 may be in communication with network 102 via different access networks, and so forth. Thus, these and other modifications are all contemplated within the scope of the present disclosure.

Figure 2:
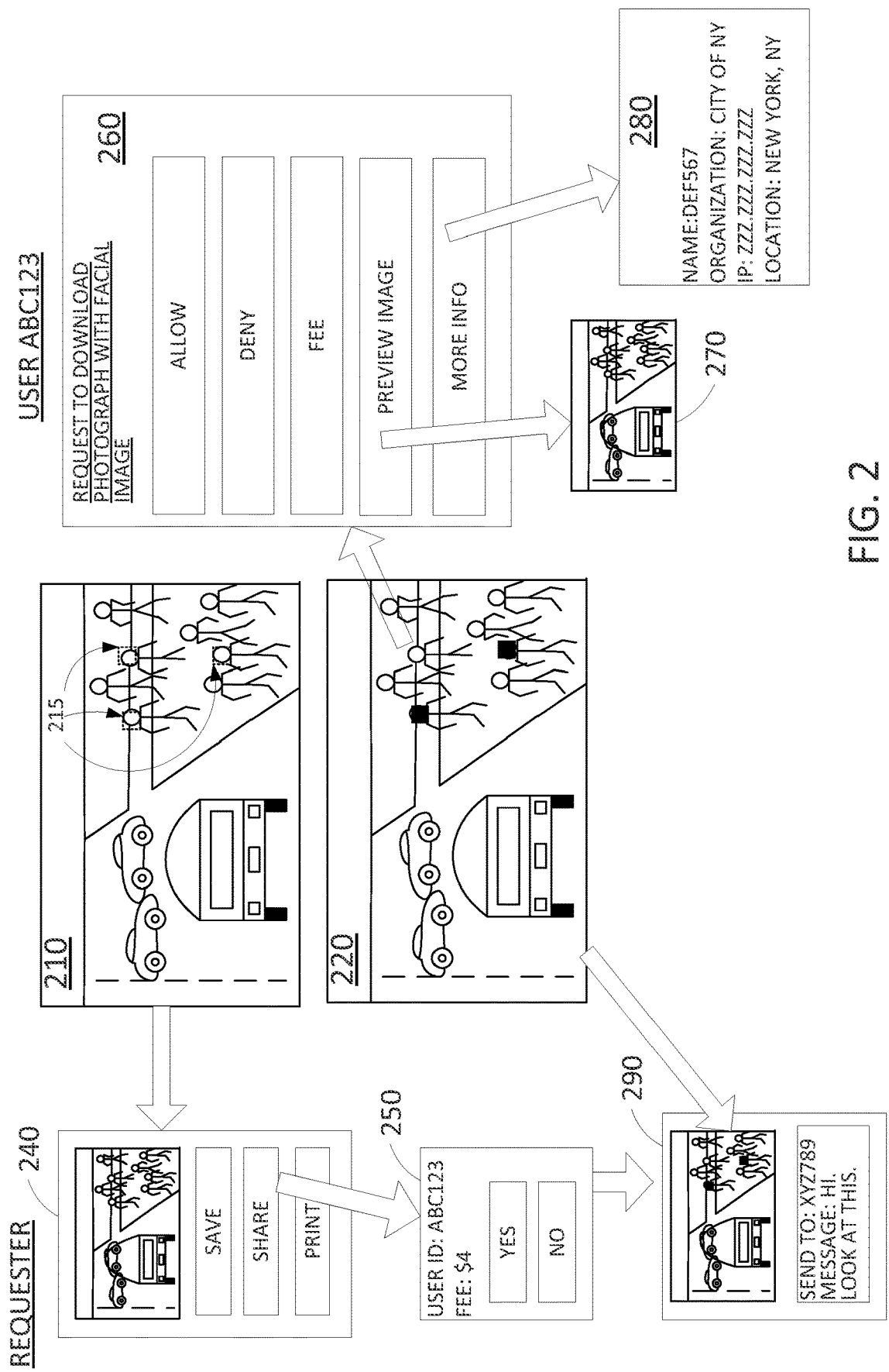
FIG. 2 illustrates an example interaction related to biometric data access usage, in accordance with the present disclosure.

To further aid in understanding the present disclosure, FIG. 2 illustrates an example interaction related to biometric data access usage, in accordance with the present disclosure. For instance, a requester may obtain an image 210 which may be displayed on a display screen of a computing device of the requester, such as via interface 240. For example, the requester may obtain the image 210 showing a road intersection, vehicles, and various pedestrians. In one example, the image may be provided to a biometric data access server or may be requested through such a biometric data access server, which may screen the image 210 for biometric data which may be subject to biometric data access rules/conditions. In this case, there may be three users 215 having facial images identified in the image 210. However, the respective biometric data access rules for each of the users 215 for "viewing" may be "allow all." As such, the biometric data access server may provide the image 210 in unmodified form to the device of the requester for display (such as shown in the example interface 240). Alternatively, or in addition, the device may permit itself to access and/or to display the image 210 in unmodified form (e.g., if the image 210 is already possessed by the device). It should be noted that while there may be other facial images in the image 210, these may not be matched to users in a biometric identity database. As such, in the present example these facial images may not be subject to any biometric data access restrictions. However, in another example, a default may be to deny access to any unidentified facial images (e.g., depending upon the type of content, the source of the content, the class or identity of a requester, and so forth).

As illustrated in FIG. 2, the interface 240 includes various selectable buttons, such as "save," "print," and "share." For instance, in addition to viewing the image 210, the requester may seek to further use the image 210 in various ways. For illustrative purposes, the requester may further seek to share the image 210, such as sending a text message to another, e.g., by tapping or clicking the "share" button, or by speaking a voice command or other inputs. In this case, the request may be sent to the biometric data access server, which may match further biometric data access conditions of the users 215 to the request for the new/additional type of usage. For instance, two of the users 215 may have "deny all" settings for requests to share content containing their facial images, while one of the users 215 may have a setting of "ask every time" for sharing requests. As such, the two of the users 215 may have their facial images obfuscated as shown in modified image 220. However, the biometric data access server may present the last of the users 215 with an access request. For instance, a screen of a computing device of User ABC123 may present the request via interface 260, which may include a notification of the request and various selectable buttons, such as "allow," "deny," "fee," "preview image," and "more info." For example, if the User ABC123 selects "preview image," a scaled version 270 of the image 210 may be presented so as to give the User ABC123 a better sense of the context in which access to the facial image is being requested (e.g., how prominent is the User ABC123 in the scene, what else is around, etc.). Likewise, if the User ABC123 selects "more info," an information box 280 may be presented with additional information, such as an identifier of the requester (e.g., DEF567), an organization of the requester, an IP address, a location (such as may be determined from the IP address, provided by the requester when registering as a user of the biometric data access management service), etc.

In this case, the User ABC123 may select "fee" to allow the sharing of the image 210 containing the facial image of User ABC123 if a fee is agreed to by the requester (e.g., $4.00). The biometric data access server may convey the fee requirement to the requester, which may be presented by the device of the requester via interface 250. The requester may agree to the fee by clicking or pressing the "yes" button, or providing a voice command or other inputs indicating assent. In one example, the biometric data access server may generate modified version 220 of the image 210 in response, which may include a clear facial image of the User ABC123 (e.g., one of the users 215) and obfuscated facial images for the other two of users 215. The modified version 220 may then be provided in this form to the device of the requester for presentation, such as via interface 290. For example, interface 290 may present the modified image 220 along with one or more additional interface elements to allow entry of recipient information (e.g., XYZ789), a text portion of a message, etc. In another example, the biometric data access server may hold the modified version 220, and the message to user XYZ789 may be sent via the biometric data access server when the requester is finished composing the message. For instance, the biometric data access server may append the modified version 220 to the message and forward the message to a device of the recipient user XYZ789 and/or to an SMS/text message server or the like that handles messages for user XYZ789.

It should be noted that the foregoing illustrates merely one example of an interaction related to biometric data access usage, in accordance with the present disclosure. Thus, other, further, and different example screens and/or user interface(s) may be utilized in various designs. In addition, different types of media/content may be accessed, screened, and restricted and/or modified for presentation or for other use by a user, and so forth. For instance, a user interface may permit a requester to listen to an audio recording as streaming audio that includes a voice of a user. However, when the requester seeks to save a local copy to the device of the requester, the biometric data access server may impose one or more conditions of one or more users having biometric data (e.g., voices) contained in the audio. Thus, these and other modifications are all contemplated within the scope of the present disclosure.

Figure 3:
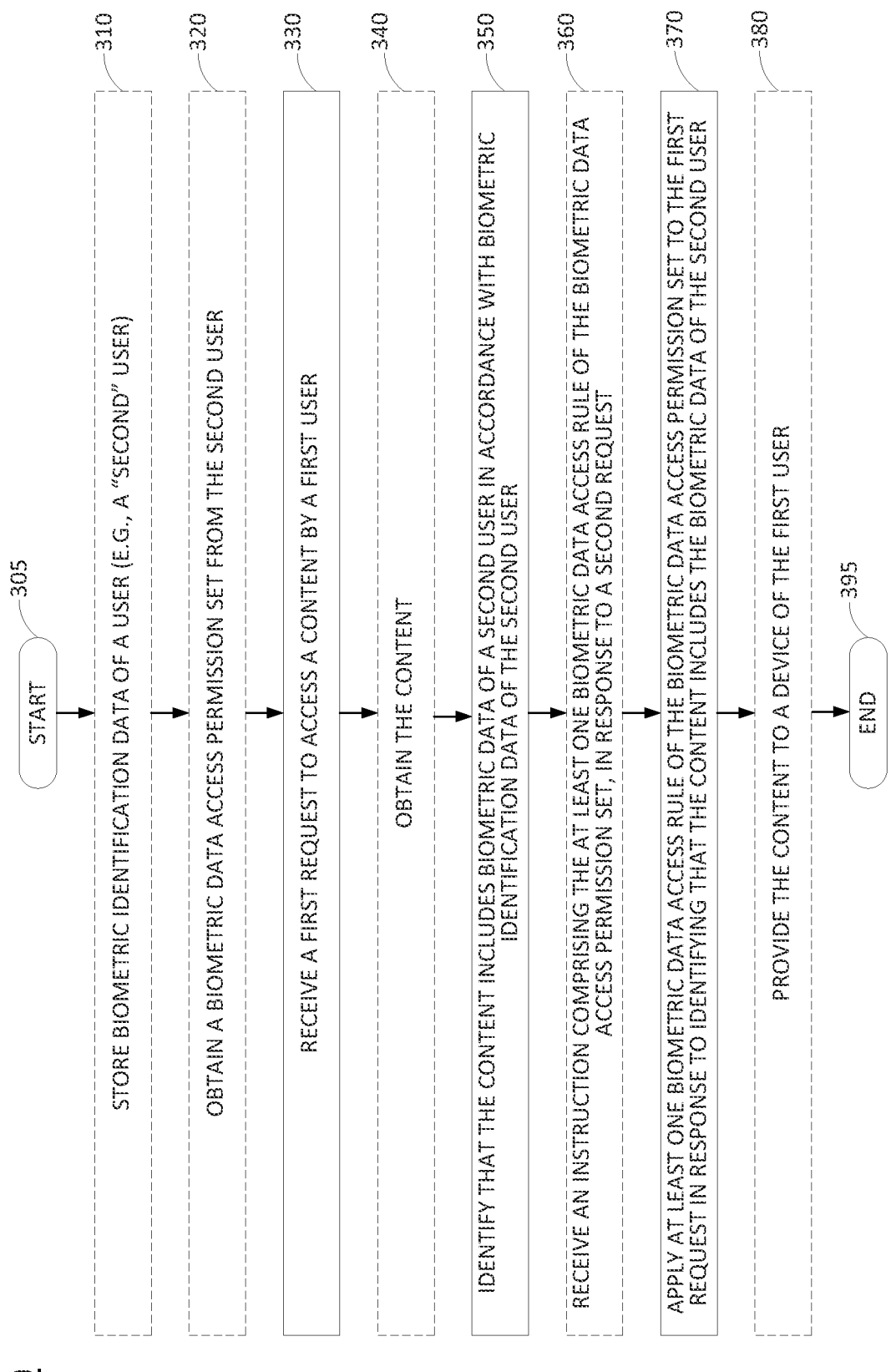
FIG. 3 illustrates a flowchart of an example method for applying at least one biometric data access rule of a biometric data access permission set to a request of a first user to access content in response to identifying that the content includes biometric data of a second user.

FIG. 3 illustrates a flowchart of an example method 300 for applying at least one biometric data access rule of a biometric data access permission set to a request of a first user to access content in response to identifying that the content includes biometric data of a second user, in accordance with the present disclosure. In one example, the method 300 is performed by a component of the system 100 of FIG. 1, such as by server(s) 116, application server 104, device 115 and/or any one or more components thereof (e.g., a processor, or processors, performing operations stored in and loaded from a memory), by server(s) 116, application server 104, and/or device 115 in conjunction with one or more other devices, such as DB 106, DB(s) 118, device 114, content source(s) 119, and so forth. In one example, the steps, functions, or operations of method 300 may be performed by a computing device or system 400, and/or processor 402 as described in connection with FIG. 4 below. For instance, the computing device or system 400 may represent any one or more components of a device, server, and/or application server in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and may proceed to optional step 310 or to step 330.

At optional step 310, the processing system may store biometric identification data of a user (e.g., a "second" user). As referred to herein, "biometric identification data" may comprise "biometric data" that is used to identify the user, e.g., a voice signature, facial ID, fingerprint model, etc. For instance, this may include data sets, feature vectors, machine learning models, or the like that may not be rendered in a media/content form that is readily human understandable, but which may be used to identify corresponding biometric data of the person in media that is intended for human use (e.g., audio containing human perceptible speech or other utterances), video or still images containing scenes captured via a camera, etc. However, the biometric identification data in one example can also include these types of content intended for human use and containing the person's biometric data, such as a photograph of a person's face, an audio recording containing the person's voice, or the like that may be used for pattern matching-based identification of other images of the person's face, other audio recordings of the person's voice, etc.

In one example, step 310 may include obtaining the biometric identification data, such as the second user providing an image of the second user's face, providing a sample audio recording of the second user's voice, etc. In one example, step 310 may include generating the biometric identification data. For instance, the processing system may obtain sample images of the second user's face, sample audio recordings of the second user's voice, a sample fingerprint image/scan, etc., from which the processing system may generate a corresponding detection model, such as facial ID (e.g., a facial image detection model), a voice signature, a fingerprint ID/signature, etc.

At optional step 320, the processing system may obtain a biometric data access permission set from the second user. The biometric data access permission set may include at least one biometric data access rule for the second user, such as a rule to block access (e.g., to biometric data of a particular type of biometric data of the second user), a rule to request a permission of the second user to grant the access to the type of biometric data, or a rule to request an agreement of the first user to pay a fee to permit the access. Alternatively, or in addition, the at least one biometric access rule may comprise a rule to obfuscate a portion of a content comprising less than all of the content (e.g., to obfuscate the portion of a content containing the biometric data of the second user). For instance, in one example, the second user may not be permitted to entirely block the usage of the content, but may restrict the usage of the portion of the content containing the biometric data of the second user. To illustrate, the second user may not have the right to entirely block the usage of a video feed captured from a public location, such as via a camera of a city department of transportation, department of public safety, or the like. However, the second user may be able to restrict the usage such that the portion of the image containing the second user's face must be obfuscated.

At step 330, the processing system receives a first request to access a content by a first user. In one example, the processing system may comprise a computing device of the first user that may receive the input via an interface of the computing device itself (e.g., a user input of the first user). For instance, in an example in which the processing system comprises a device of the first user, the processing system may implement a browser plug-in, a background application, or an application extension to receive the first request. In another example, the processing system may comprise a network-based processing system, in which case the first request may be received from the device of the first user. In one example, step 330 may include obtaining information as to how to obtain the content, e.g., a uniform resource locator (URL), or the like, which may be used to access the content. In various examples, the first request may comprise a request to: view or listen to the content via the device of the first user, save the content to the device of the first user (e.g., save to storage, or screen capture and store), forward the content to at least a third user, post the content to a network location for access by a plurality of other users (e.g., a website, a shared storage locker, etc.), use the content in an offline media presentation (e.g., a print advertisement in newspaper, magazine, billboard, mailer, etc.), or the like.

In one example, the first user may have a first level of access to the content in accordance with the biometric data access permission set, and the first request may be a request to obtain a second level of access to the content in accordance with the biometric data access permission set. For instance, in one example, the biometric data access permission set may include at least one rule that has different actions for different requesting entities. Thus, for example, the first user may have a first level of access based upon a class or identity of the first user, while other users may not have such first level access. For example, the first level access may comprise an authorization to view or listen to the biometric data of the second user in the content. However, the first user may seek to use the content beyond the first level access (e.g., a different type of access or "second level" access, such as printing, storing, forwarding, reposting, etc.), which may call for additional authorization from the second user, agreement to a fee, etc.

At optional step 340, the processing system may obtain the content. For instance, the content may be obtained from a server offering such content (e.g., a web server, a server of a social networking service, a SMS/text message server, etc.), may be obtained from a camera, microphone, or the like, and so forth. In an example in which the processing system comprises a network-based processing system, the content may be obtained from a computing device of the first user (which may have previously obtained the content from a web server, social media server, etc.).

At step 350, the processing system identifies that the content includes biometric data of a second user in accordance with biometric identification data of the second user. For instance, the biometric identification data of the second user may comprise first facial image data, and the biometric data of the second user may comprise second facial image data. For example, step 350 may comprise a pattern matching between the first facial image data and the second facial image data. In one example, the first facial image data may comprise a facial ID of the second user, e.g., a SIFT or SURF feature vector, an eigenface, etc. In another example, the first facial image data may comprise a machine learning model for detecting facial images of the second user. Similarly, in another example, the biometric identification data of the second user may comprise a voice signature, and the biometric data of the second user may comprise audio data including a voice of the second user, and so on for other types of biometric data, such as retina scans, fingerprints, gait and mannerisms, and so on. In an example in which the processing system comprises a device of the first user, step 350 may comprise submitting a second request to a network-based service (e.g., a biometric data access server) to scan the content for user biometric data having associated biometric data access rules.

At optional step 360, the processing system may receive an instruction comprising the at least one biometric data access rule of the biometric data access permission set, in response to the second request. For instance, in an example in which the processing system comprises a computing device of the first user, the processing system may be configured to receive and to apply the at least one biometric data access rule.

At step 370, the processing system applies the at least one biometric data access rule of the biometric data access permission set to the first request in response to the identifying that the content includes the biometric data of the second user. For instance, step 370 may comprise blocking the access, requesting the permission of the second user to grant the access, or requesting the agreement of the first user to the payment of fee to permit the access, e.g., depending upon the type of biometric data and type of access, and depending upon the particular data access rule that may be set for the second user for the type of access and the type of biometric data. In one example, step 370 may include modifying the content, such as blocking-out, pixelating, blurring, deleting, or otherwise obfuscating the biometric data of the user within the content. In an example in which the processing system comprises a device of the first user, the processing system may implement a browser plug-in, a background application, or an application extension to apply the at least one biometric data access rule of the biometric data access permission set.

At optional step 380, the processing system may provide the content to a device of the first user, e.g., in modified or unmodified form. For instance, optional step 380 may be performed when the processing system comprises a network-based processing system.

Following step 380, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300 for different users having respective biometric data identified in the content, for different types of usage of the content that the first user may request, for different content being requested by the first user, for different users requesting usage of the content, and so forth. In one example, the method 300 may include registering users for a biometric data usage management service (e.g., provided by the processing system), obtaining user information, such as name, organization, location, etc., and so on. In one example, the method 300 may be expanded or modified to include steps, functions, and/or operations, or other features described above in connection with the example(s) of FIGS. 1 and 2, or as described elsewhere herein. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the examples of FIG. 2 or 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for applying at least one biometric data access rule of a biometric data access permission set to a request of a first user to access content in response to identifying that the content includes biometric data of a second user, and various input/output devices 406, e.g., one or more sensors, a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for applying at least one biometric data access rule of a biometric data access permission set to a request of a first user to access content in response to identifying that the content includes biometric data of a second user (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for applying at least one biometric data access rule of a biometric data access permission set to a request of a first user to access content in response to identifying that the content includes biometric data of a second user (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   receiving, by a processing system including at least one processor, a first request to access a content by a first user;
   identifying, by the processing system, that the content includes biometric data of a second user in accordance with biometric identification data of the second user; and
   applying, by the processing system, at least one biometric data access rule of a biometric data access permission set to the first request in response to the identifying that the content includes the biometric data of the second user.

2. The method of claim 1, wherein the at least one biometric data access rule comprises:
   a rule to block the access of the content;
   a rule to request a permission of the second user to grant the access of the content; or
   a rule to request an agreement of the first user to a fee to permit the access of the content.

3. The method of claim 2, wherein the applying the at least one biometric data access rule comprises:
   blocking the access of the content, when the at least one biometric data access rule comprises the rule to block the access of the content;
   requesting the permission of the second user to grant the access of the content, when the at least one biometric data access rule comprises the rule to request the permission of the second user to grant the access of the content; or
   requesting the agreement of the first user to the fee to permit the access of the content, when the at least one biometric data access rule comprises the rule to request the agreement of the first user to the fee to permit the access of the content.

4. The method of claim 1, wherein the at least one biometric data access rule comprises:
   a rule to obfuscate a portion of the content comprising less than all of the content.

5. The method of claim 4, wherein the portion of the content includes the biometric data of the second user.

6. The method of claim 1, wherein the processing system is a network-based processing system.

7. The method of claim 6, wherein the first request is received from a device of the first user.

8. The method of claim 6, further comprising:
   storing the biometric identification data of the second user.

9. The method of claim 6, further comprising:
obtaining the biometric data access permission set from the second user.

10. The method of claim 6, further comprising:
obtaining the content, prior to the identifying.

11. The method of claim 1, wherein the processing system comprises a device of the first user, wherein the identifying comprises submitting a second request to a network-based service to scan the content for user biometric data having associated biometric data access rules.

12. The method of claim 11, further comprising:
receiving an instruction comprising the at least one biometric data access rule of the biometric data access permission set, in response to the second request.

13. The method of claim 12, wherein the processing system is configured to apply the at least one biometric data access rule.

14. The method of claim 1, wherein the first request to access the content comprises a request to:
view the content via a device of the first user;
listen to the content via a device of the first user;
save the content to a device of the first user;
forward the content to at least a third user;
post the content to a network location for access by a plurality of other users; or
use the content in an offline media presentation.

15. The method of claim 1, wherein the first user has a first level of access to the content in accordance with the biometric data access permission set, and wherein the first request is a request to obtain a second level of access to the content in accordance with the biometric data access permission set.

16. The method of claim 1, wherein the biometric identification data of the second user comprises first facial image data, and wherein the biometric data of the second user comprises second facial image data.

17. The method of claim 16, wherein the first facial image data comprises a facial image detection model of the second user.

18. The method of claim 1, wherein the biometric identification data of the second user comprises a voice signature, and wherein the biometric data of the second user comprises audio data including a voice of the second user.

19. A non-transitory computer-readable medium storing instructions which, when executed by a processing system including at least one processor, cause the processing system to perform operations, the operations comprising:
receiving a first request to access a content by a first user;
identifying that the content includes biometric data of a second user in accordance with biometric identification data of the second user; and
applying at least one biometric data access rule of a biometric data access permission set to the first request in response to the identifying that the content includes the biometric data of the second user.

20. An apparatus comprising:
a processing system including at least one processor; and
a computer-readable medium storing instructions which, when executed by the processing system, cause the processing system to perform operations, the operations comprising:
receiving a first request to access a content by a first user;
identifying that the content includes biometric data of a second user in accordance with biometric identification data of the second user; and
applying at least one biometric data access rule of a biometric data access permission set to the first request in response to the identifying that the content includes the biometric data of the second user.

* * * * *